(12) United States Patent
Flewitt et al.

(10) Patent No.: US 6,564,058 B1
(45) Date of Patent: May 13, 2003

(54) CELLULAR RADIO NETWORK

(75) Inventors: Adrian Robert Flewitt, Lechlade (GB); Peter Gunreben, Bubenreuth (DE); Martine Madelaine Herpers, Herzogenaurach (DE)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/393,112

(22) Filed: Sep. 10, 1999

(30) Foreign Application Priority Data

Sep. 15, 1998 (EP) .............................................. 98307490

(51) Int. Cl.[7] ................................................ H04Q 7/20
(52) U.S. Cl. ........................ 455/437; 455/436; 455/446
(58) Field of Search ................................ 455/422, 436, 455/437, 439, 442, 449, 446, 450

(56) References Cited

U.S. PATENT DOCUMENTS

| | | | |
|---|---|---|---|
| 5,428,816 A | | 6/1995 | Barnett et al. ............. 455/33.2 |
| 5,722,073 A | * | 2/1998 | Wallstedt et al. ........... 455/437 |
| 5,915,221 A | * | 6/1999 | Sawyer et al. ............. 455/437 |
| 5,974,320 A | * | 10/1999 | Ward et al. ................ 455/437 |
| 6,112,089 A | * | 8/2000 | Satarasinghe ............... 455/442 |
| 6,173,181 B1 | * | 1/2001 | Losh ........................ 455/437 |
| 6,304,755 B1 | * | 10/2001 | Tiedemann, Jr. et al. ... 455/437 |

FOREIGN PATENT DOCUMENTS

WO  WO 97/32445  9/1997  ............ H04Q/7/38

OTHER PUBLICATIONS

European Search Report, dated Feb. 17, 1999.

* cited by examiner

*Primary Examiner*—Nay Maung

(57) ABSTRACT

A method for providing adaptive neighbor cell lists for a cellular radio network. In cellular radio networks, handovers are used to hand over a call from one cell to another. To identify possible cells for handovers, neighbor cell lists are used for each cell containing information on neighboring cells. Due to system limitations these neighbor cell lists sometimes do not contain all available neighboring cells. The present invention overcomes this disadvantage by providing a method that allows adapting the neighbor cell lists according to the actual location of a mobile station and the actual reception conditions at the time the mobile station is operative. The method provides a first part of the neighbor cell list containing information on fixed neighbor cells, and it provides a second part of the neighbor cell list containing information on varying neighbor cells.

4 Claims, 1 Drawing Sheet

CELLULAR RADIO NETWORK

CROSS-REFERENCED TO RELATED APPLICATION

This application claims priority of European Patent Application No. 98307490.7, which was filed on Sep. 15, 1998.

TECHNICAL FIELD

The present invention relates generally to the field of cellular radio networks and a method for operating cellular radio networks, particularly a method for providing adaptive neighbor cell lists for a cellular radio network.

BACKGROUND OF THE INVENTION

The basic idea underlying cellular radio networks is to use within a limited band width only a given number of frequencies for setting up radio channels. The given frequencies are used several times to provide the traffic capacity required despite the limited bandwidth. For this purpose every cell of the cellular radio network uses only one frequency or a subset of frequencies from within the available bandwidth. Neighboring cells do have different frequencies or subsets of frequencies. Cells using the same frequency or subset of frequencies are located sufficiently far from each other. In that way signal strengths of the different radio channels represented by the different frequencies have decreased sufficiently in order to avoid disturbances caused from co-channel interference.

In order to achieve seamless coverage and to support the traffic capacity required, a number of system parameters for the design of the cellular radio network has to be considered, e. g. traffic intensity in different areas, maximum transmission power and interference. When the design of a cellular radio network is completed, a dedicated group of frequencies is allocated to each cell, i. e. a number of carriers having the given frequencies.

Ongoing calls are handled by the cellular radio networks by using handovers. If a mobile station (MS) having an ongoing call leaves one cell or if the reception conditions for that cell, i. e. the reception conditions for the frequency used, deteriorate the MS is handed over to that neighboring cell which offers the best reception. To achieve this, handover algorithms are used in the cellular radio network. Usually the MS monitors the reception quality of the serving cell and a number of neighboring cells and sends the information on the reception quality to a base station transceiver (BTS) of the serving cell. The information is then transmitted to a base station controller (BSC). BTS or BSC decides on necessary handovers. The BSC provides a list to the MS, containing the neighbor cells of the serving cell which have to be monitored by the MS. In common cellular radio networks the size of the neighboring cell list is limited, e. g. to information on 32 neighboring cells. This limitation causes a restrictions to the operability of the cellular radio network, if the cellular radio network has a complex cell structure employing e. g. macro cells with an underlying structure of micro cells. For complex cell structures like the mentioned one, the limitation to 32 neighboring cells in the neighboring cell list may cause problems to identify the cell offering the best reception, because not all neighbouring cells can be monitored.

SUMMARY OF THE INVENTION

Accordingly, it is an object of the present invention to provide a method for providing neighbor cell lists for a cellular radio network. It is the aim of the inventive method under consideration to avoid the drawbacks known from the state of the art.

The object is achieved by providing a method for operating a cellular radio network having neighbor cell lists comprising steps of providing a first part of the neighbor cell list containing information on fixed neighbor cells, and providing a second part of the neighbor cell list containing information on varying neighbor cells.

It is an advantage of the present invention, that it allows to adapt the neighbor cell lists according to the actual location of a mobile station and the actual reception conditions at the time the mobile station is operative.

The present invention will become more fully understood from the detailed description given hereinafter and further scope of applicability of the present invention will become apparent. However, it should be understood that the detailed description is given by way of illustration only, since various changes and modifications within the spirit and scope of the invention will become apparent to those skilled in the art.

BRIEF DESCRIPTION OF THE DRAWINGS

The following detailed description is accompanied by drawings of which

Identical denotations in different Figures represent identical elements.

DETAILED DESCRIPTION

Figure 1:
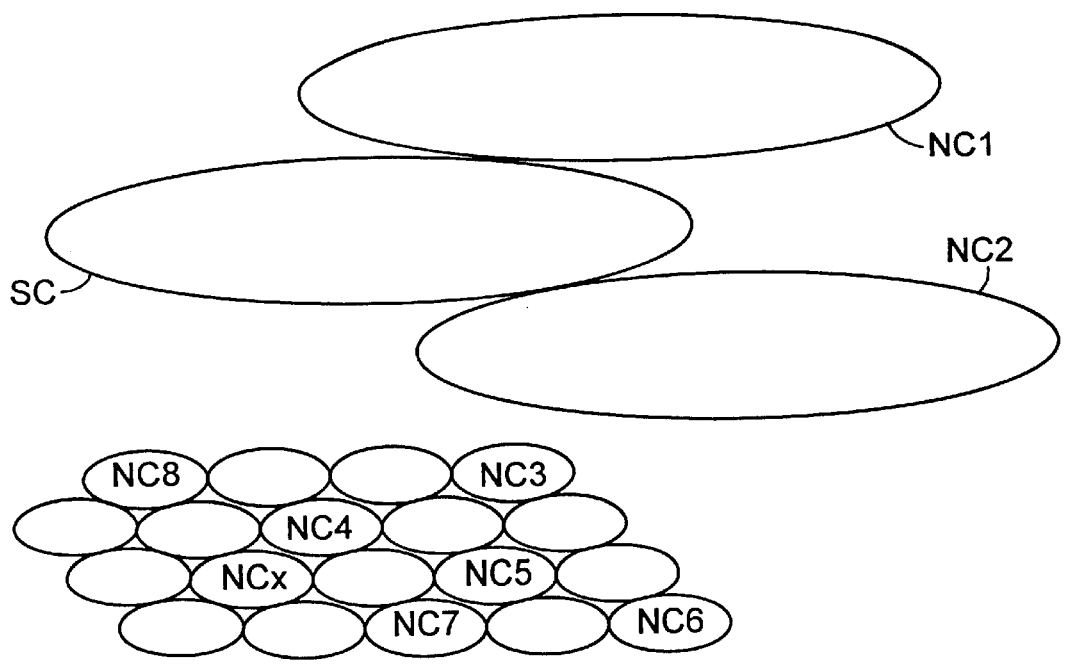
FIG. 1 is an illustration for a first neighbor cell list showing a section of a cellular radio network having macro and micro cells.

Although the present invention is suited for all kinds of cellular radio networks employing mobile assisted cellular handover, it will be explained in the following by using a cellular radio network based on the Global System for Mobile communications (GSM) as an example. For greater detail of the GSM standard reference is made to "The GSM system for Mobile Communications", M. Mouly and M.-B. Pautet, Palaiseau, France, 1992, ISBN No. 2-95071900-7. In FIG. 1 a section of a cellular radio network having macro cells and micro cells is shown. One macro cell SC is considered to be a serving cell, i. e. a macro cell which actually is used to connect a mobile part of the cellular radio network to a fixed part of the cellular radio network. As e. g. explained in greater detail in the above mentioned reference, the mobile part is being formed by a mobile station (MS), whereas the fixed part is being formed by at least one mobile switching center (MSG) which e. g. connects the cellular radio network to a publicly switched telephone network. To the MSC one or more base station controllers (BSC) are connected which control base transceiver stations (BTS). Radio equipment of the BTSs forms the cells which are used for radio connecting the MSs to the fixed part of the cellular radio network. During the call the MS measures the reception level or the reception quality of neighboring cells. To enable the MS to do so, the fixed part of the cellular radio network, e. g. the serving BSC, sends a neighbor cell list containing information on neighboring cells via the serving BTS to the MS. The neighbor cell list is set up or generated by an operator at the time of network planning for each cell being used in the cellular radio network. Due to the system limitation of e. g. 32 neighboring cells per neighbor cell list, as mentioned earlier, it is not always possible to measure all neighboring cells of the actual serving cell.

To overcome this problem the neighbor cell lists are separated in a first and a second part. The first part of a neighbor cell list contains information on neighboring cells being members of a higher cell hierarchy, e. g. in FIG. 1 macro cells NC1 and NC2 are contained in the first part of the neighbor cell list of cell SC. Cells NC1 and NC2 can be defined by an operator or can be the so called first tier cells, i. e. directly neighboring cells. The second part of a neighbor cell list contains information on neighboring cells being members of a lower cell hierarchy, e. g. in FIG. 1 micro cells NC3 to NC8 and NCx, covered by the serving cell SC of the higher hierarchy. The start information contained in the second part of the cell list has to be defined by an operator and has to be an adequate subset of the available micro cells, e. g. micro cells equally distributed over the coverage area of the serving cell SC.

During a call the MS measures e. g. the receive levels of all neighboring cells contained in the neighbor cell list, i. e. information available in the first and second part of the neighbor cell list, and sends the measured receive levels via the serving BTS to the serving BSC. If the measurements show that one of the micro cells, e. g. micro cell NCx, contained in the second part of the neighbor cell list offers sufficiently good reception conditions, the BCS generates a new second part of the neighbor cell list which replaces the previously used second part of the neighbor cell list. If more than one micro cell show sufficiently good reception conditions, the micro cell having the best reception conditions is chosen. If no micro cell offers sufficiently good reception conditions no change is made. The decisions on the reception conditions e. g. can be made based on an averaged receive level for the cells being part in the respective neighbor cell list.

Figure 2:
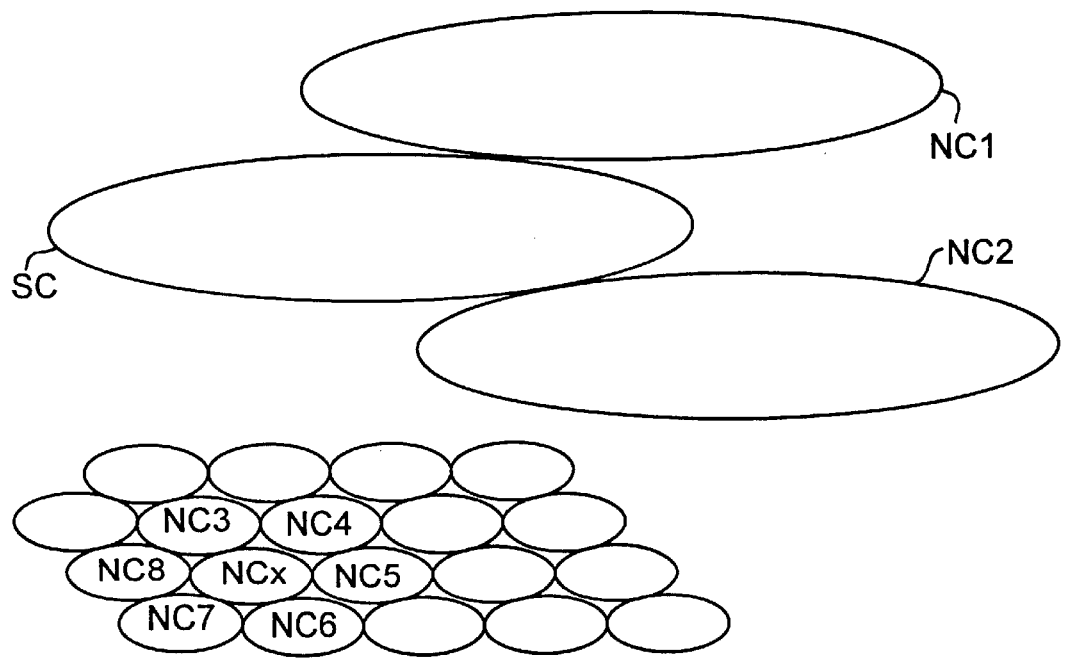
FIG. 2 is an illustration for a second neighbor cell list showing a section of a cellular radio network having macro and micro cells.

The micro cells contained in the generated second part of the neighbor cell list, as shown in FIG. 2, contain micro cell NCx which previously was found to be the best cell and all first tier micro cells N3 to N8 of micro cell NCx. In addition to first tier micro cells, which can be determined automatically by the BSC, additional micro cells can be defined by an operator as belonging to e. g. micro cell NCx, i. e. the additional micro cells will be added to the list in case micro cell NCx has been identified as best cell as described above. If for one micro cell N3 to N8 being part of the generated second part of the neighbor cell list which has been sent to the MS better receive conditions are measured than for micro cell NCx, a new second part of the neighbor cell list is generated having that micro cell as a center with its first tier micro cells. If no better micro cell can be identified the call is handed over to the best micro cell, e. g. micro cell NCx.

If it shows at the time of generation of a new second part of the neighbor list that the limitation of e. g. 32 neighboring cells is exceeded, the members of the second part of the neighbor cell list can be limited to that micro cells being specified by the operator, as mentioned above, and that micro cells automatically calculated by the BSC having the best reception conditions, in order to fulfil the given limitation. For a neighbor cell list having a first part containing e. g. 15 macro cells, the second part only can contain 17 micro cells.

The above mentioned operator defined cells are especially of advantage e. g. in a so called line of sight scenario, i. e. a location that allows the reception of a distant macro cell, which normally can not be received at that location. One such location is a high building where a MS, located at a higher level, may receive a macro cell normally not available. To cover this scenario the operator defines micro cells for locations showing line of sight reception and adds them to the second part of the neighbor cell list for the distant macro cell.

What is claimed is:

1. A method for operating a wireless radio network having neighbor cell lists comprising steps of:

providing a first part of the neighbor cell list containing information on fixed neighbor cells, the fixed neighbor cells being macro cells; and providing a second part of the neighbor cell list containing information on varying neighbor cells, the varying neighbor cells being micro cells, wherein said second part of the neighbor cell list contains information about a first micro cell having the highest receive level of the micro cells in a previous neighbor cell list, and wherein said second part of the neighbor cell list also contains information about the micro cells that are neighbors of said first micro cell.

2. A method according to claim 1, wherein all neighbor cell lists are sent from a fixed part of the wireless radio network to a mobile part of the wireless radio network.

3. A method according to claim 1, wherein the information on neighbor cells of the first part of the neighbor cell lists and information on the neighbor cells of the second part of the neighbor cell lists are defined as part of network planning.

4. A method according to claim 1, wherein the wireless radio network is a GSM network.

* * * * *